US009227879B2

(12) United States Patent
Allen et al.

(10) Patent No.: US 9,227,879 B2
(45) Date of Patent: Jan. 5, 2016

(54) METHOD AND APPARATUS FOR ALIGNING A SUPPORT WITH RESPECT TO A HONEYCOMB BODY

(71) Applicant: Corning Incorporated, Corning, NY (US)

(72) Inventors: Bruce Patrick Allen, Lawrenceville, PA (US); Richard Wayne Bernard, Corning, NY (US); Jeffrey John Domey, Elmira, NY (US); Rodney Gene Dunn, Blacksburg, VA (US); William Joseph Zaidel, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 163 days.

(21) Appl. No.: 14/053,063

(22) Filed: Oct. 14, 2013

(65) Prior Publication Data
US 2014/0033973 A1 Feb. 6, 2014

Related U.S. Application Data

(62) Division of application No. 12/864,161, filed as application No. PCT/US2008/002813 on Feb. 29, 2008, now Pat. No. 8,574,684.

(51) Int. Cl.
| | |
|---|---|
| *B05C 5/02* | (2006.01) |
| *C04B 38/00* | (2006.01) |
| *B05C 11/02* | (2006.01) |
| *B05C 11/08* | (2006.01) |
| *B28B 11/04* | (2006.01) |
| *B28B 19/00* | (2006.01) |

(52) U.S. Cl.
CPC ........... *C04B 38/0006* (2013.01); *B05C 11/021* (2013.01); *B05C 11/023* (2013.01); *B05C 11/08* (2013.01); *B28B 11/04* (2013.01); *B28B 19/0038* (2013.01); *B05C 5/0208* (2013.01)

(58) Field of Classification Search
CPC ....... C04B 38/0006; B28B 11/04; B28B 19/0038; B05C 11/021; B05C 11/023; B05C 11/08; B05C 5/0208
USPC ............................ 118/304, 320, 100, DIG. 11
See application file for complete search history.

(56) References Cited

U.S. PATENT DOCUMENTS

| | | | |
|---|---|---|---|
| 4,531,772 A | | 7/1985 | Ronconi |
| 5,069,234 A | * | 12/1991 | Nielsen ......................... 134/113 |
| 5,749,970 A | | 5/1998 | Fukuta et al. |
| 2005/0249877 A1 | | 11/2005 | Noro et al. |
| 2006/0102070 A1 | | 5/2006 | Noro et al. |
| 2008/0179781 A1 | * | 7/2008 | Iwata ....................... 264/177.12 |

FOREIGN PATENT DOCUMENTS

JP 08323727 12/1996

* cited by examiner

*Primary Examiner* — Laura Edwards
(74) *Attorney, Agent, or Firm* — Charles A. Greene

(57) ABSTRACT

Method is provided for applying a cement mixture to a honeycomb body including the step of aligning a first end of the honeycomb body with respect to a first longitudinal axis of a first support member. The method further includes the step of aligning a second support member with respect to the second end of the honeycomb body. The second support member is allowed to move relative to the first support member such that a second longitudinal axis of second support member is not coincident with the first longitudinal axis. The method further includes the step of fixing the position of the honeycomb body with respect to the first support member and the second support member. The method still further includes the step of applying a cement mixture to the honeycomb body. An apparatus is provided that is configured to apply a cement mixture to a honeycomb body.

5 Claims, 11 Drawing Sheets

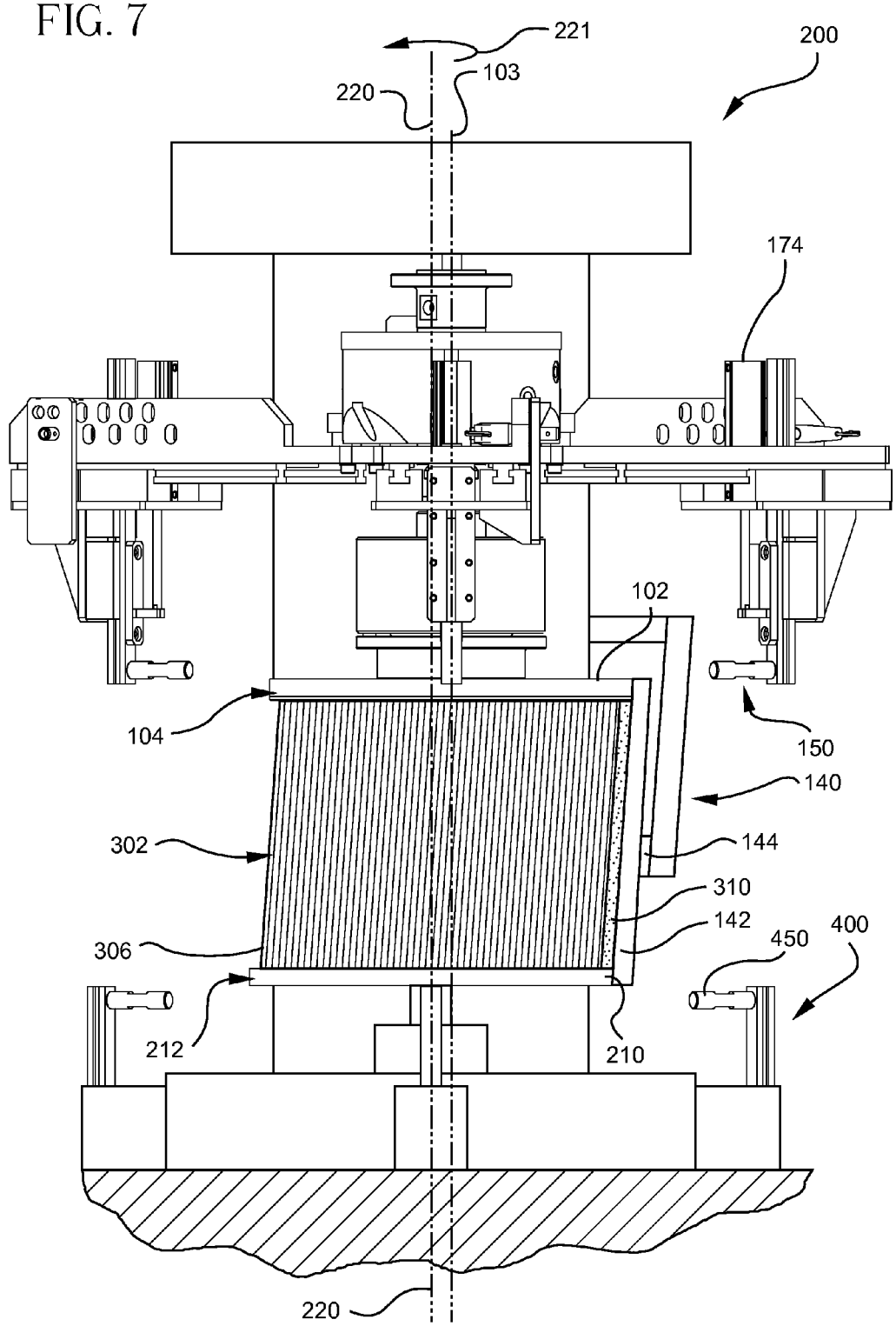

METHOD AND APPARATUS FOR ALIGNING A SUPPORT WITH RESPECT TO A HONEYCOMB BODY

CROSS-REFERENCE TO RELATED APPLICATIONS

This application is a divisional of U.S. application Ser. No. 12/864,161, filed on Jul. 22, 2010, now U.S. Pat. No. 8,574,684, issued on Nov. 5, 2013, and claims priority from and the benefit of PCT/US08/02813, filed on Feb. 29, 2008, all of which are hereby incorporated by reference for all purposes as if fully set forth herein.

TECHNICAL FIELD

The present invention relates generally to apparatus for manufacture of a honeycomb body, and more particularly, to applying an outer layer to a honeycomb body comprised of ceramic or ceramic-forming material.

BACKGROUND

Known methods and apparatus to provide a cement mixture to an outer peripheral surface of a honeycomb body can result in undesired variations in skin thickness.

SUMMARY

In one aspect, a method is provided for applying a cement mixture to a honeycomb body including a first end and a second end. The method includes the steps of aligning the first end of the honeycomb body with respect to a first longitudinal axis of a first support member. The method further includes the step of aligning a second support member with respect to the second end of the honeycomb body. The second support member is allowed to move relative to the first support member such that a second longitudinal axis of second support member is not coincident with the first longitudinal axis. The method further includes the step of fixing the position of the honeycomb body with respect to the first support member and the second support member. Furthermore, the method includes the step of applying a cement mixture to the honeycomb body.

In another aspect, an apparatus is provided that is configured to apply a cement mixture to a honeycomb body with a first end and a second end. The apparatus comprises an applicator configured to apply the cement mixture to the honeycomb body and a first support member configured to rotate about a first longitudinal axis. The apparatus further includes a second support member configured to rotate about a second longitudinal axis. A base structure is configured to rotatably support the second support member. The base structure is further configured to permit relative movement between the second support member and the first support member between a first orientation where the second longitudinal axis is positioned with respect to the first longitudinal axis and a second orientation where the second longitudinal axis is not coincident with the first longitudinal axis. The apparatus further comprises a plurality of alignment members supported by the base structure and configured to be selectively extended and retracted with respect to the base structure. The alignment members are configured to engage the second end the honeycomb body to align the second support member with respect to the second end of the honeycomb body.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

These and other features, aspects and advantages of the present invention are better understood when the following detailed description of the invention is read with reference to the accompanying drawings, in which:

FIG. 7 is a front schematic view of the example apparatus of FIG. 6 with the honeycomb body being compressed between the first support member and the second support member and an applicator applying a cement mixture to the honeycomb body;

DETAILED DESCRIPTION

The present invention will now be described more fully hereinafter with reference to the accompanying drawings in which example embodiments of the invention are shown. However, this invention may be embodied in many different forms and should not be construed as limited to the embodiments set forth herein. Like reference numbers refer to like elements throughout the various drawings.

Figure 1:
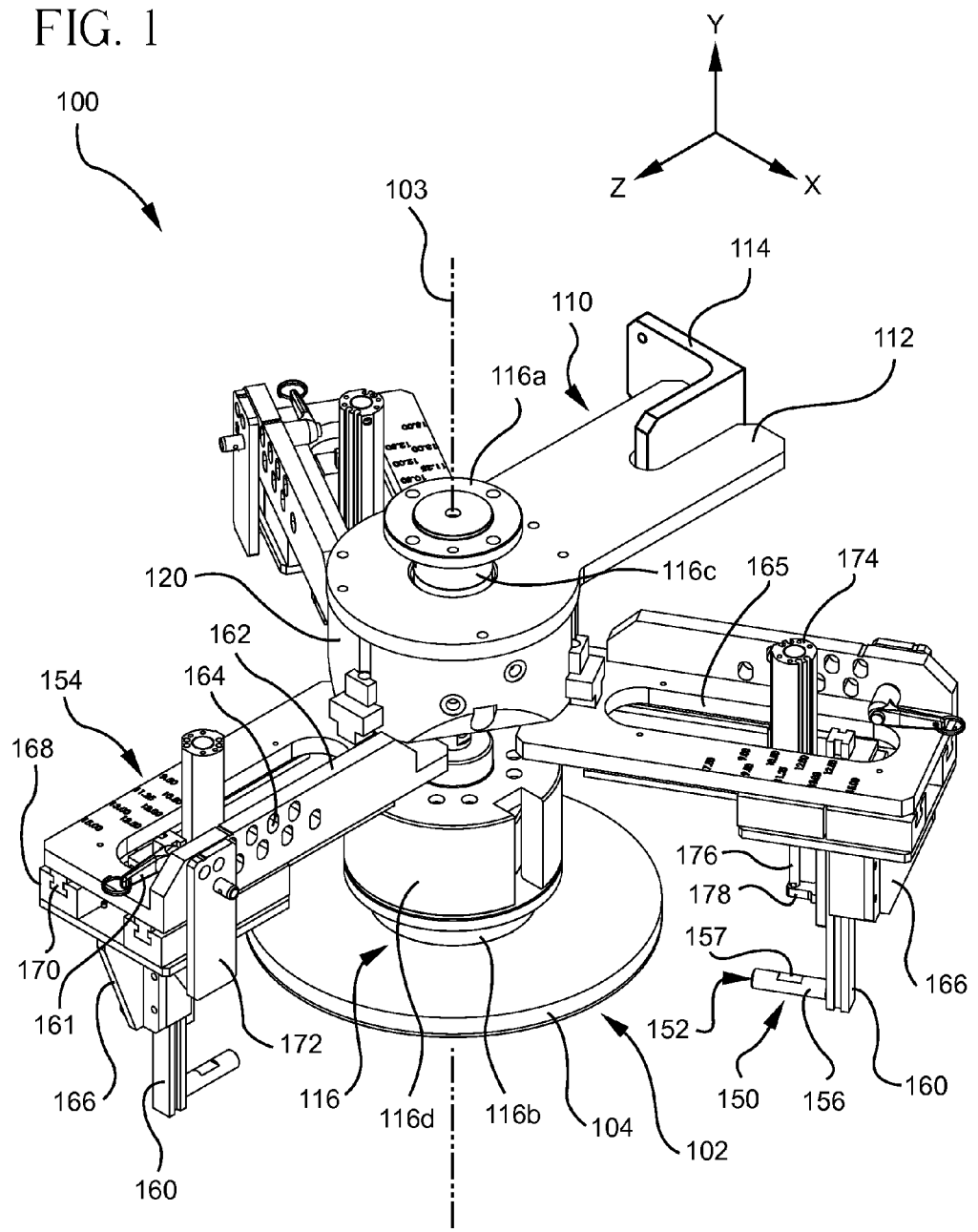
FIG. 1 is a perspective view of an example upper assembly of an apparatus in accordance with aspects of the present invention.
Figure 2:
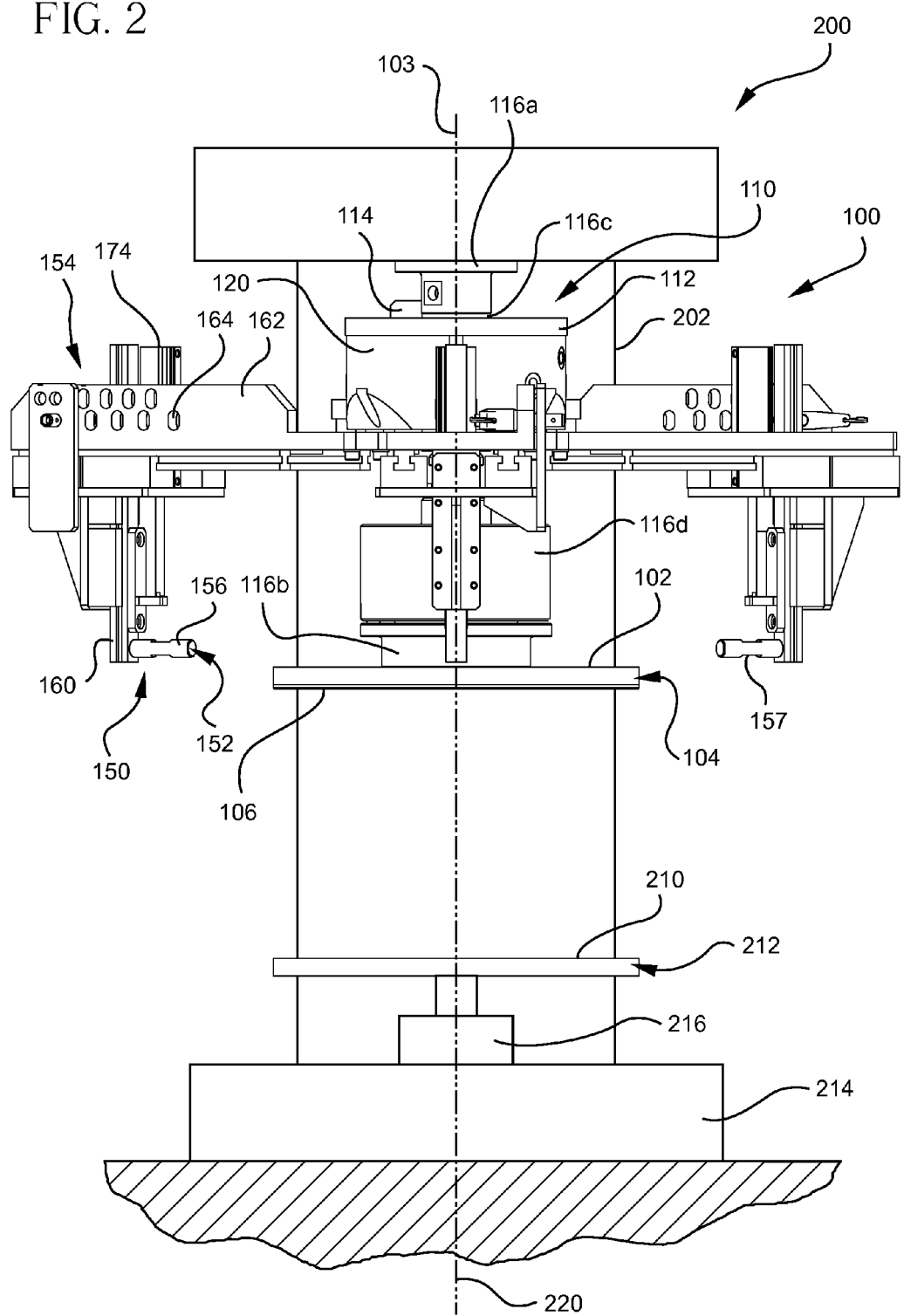
FIG. 2 is a front schematic view of an example apparatus including the upper assembly of FIG. 1 in accordance with aspects of the present invention.

As shown in FIG. 2, an apparatus 200 is provided that is configured to apply a cement mixture to a honeycomb body. The apparatus 200 includes a first support member 210 configured to rotate about a first longitudinal axis 220. The apparatus 200 further includes an upper assembly 100. Turning to FIG. 1, an example upper assembly 100 is illustrated in accordance with aspects of the present invention. The upper assembly 100 can include a second support member 102 configured to rotate about a second longitudinal axis 103. In one example, the first longitudinal axis 220 may be parallel to the second longitudinal axis 103 although the first and second longitudinal axis 103, 220 may be coincident in further examples. Still further, the first and second longitudinal axes 103, 220 may be angled, or skewed, relative to one another. Preferably, the second support member rotates about axis 103 while also nutating about axis 220; that is, axis 103 rotates about axis 220.

As illustrated, the second support member 102 can include a plate although the second support member may comprise a hub and spoke arrangement, lattice structure, or other structural arrangement. Moreover, as shown, the second support member 102 can include a second peripheral surface 104. The illustrated second peripheral surface 104 is shown as an edge with a vertical thickness that extends substantially perpendicular to the upper and lower surface of the second support member 102. In further examples, second peripheral surface can comprise a sharp or blunted edge. For example, the second peripheral surface can comprise a substantially V-shape with a sharp or blunted edge. In another example, the second peripheral surface can comprise an angularly tapered surface having an outer edge that is sharp or blunted at the top or bottom surface of the second support member 102.

The second peripheral surface can comprise a wide variety of shapes and sizes. The illustrated second peripheral surface 104 comprises a circular shape although the second peripheral surface may include other shapes in different examples. For instance, the second peripheral surface 104 can comprise an oval shape, elliptical shape or other shape that may depend on the shape of a honeycomb body 300 being coated by the apparatus 200. Preferably, a surface of the first support member 210, or the second support member 102, or more preferably both the first support member 210 and the second support member 102, that contacts the honeycomb body 300 comprises a high durometer elastic material, such as rubber, to accommodate variations in the height of the respective ends of the honeycomb body 300; preferably the elastic material is provided in a layer having sufficient elasticity and thickness to absorb local deflections of 0.5 mm, preferably 1.0 mm, due to projections or tilt that may be present on the end face of the honeycomb body 300.

The upper assembly 100 can also include a base structure 110 configured to hold a second support member 102. In one example, the base structure 110 can be configured to provide adjustable mounting of the second support member 102 with respect to a frame 202 of the apparatus 200 (see FIG. 2). For instance, as shown in FIG. 1, the base structure 110 can include a swing arm 112 adjustably attached to a support bracket 114. The connection between the swing arm 112 and support bracket 114 can permit movement of the swing arm 112 to pivot and/or translate relative to the support bracket 114 so that the second support member 102 can move, such as translate, along the illustrated x-axis, y-axis and z-axis.

The base structure 110 can further permit rotation of the second support member 102 about the second longitudinal axis 103 with respect to the base structure 110. For example, as shown in FIG. 1, the base structure 110 can include a spindle 116 with an adapter 116a, a coupling 116b, and a spindle column 116c extending between the adapter 116a and the coupling 116b. The spindle 116 can further include a quick release housing 116d that may contain a pneumatic quick release mechanism configured to permit connection and disconnection between the spindle column 116c and the coupling 116b. The spindle column 116c can be rotatably attached to the swing arm 112 with the adapter 116a positioned above the swing arm 112 and the coupling 116b positioned below the swing arm 112. Preferably, spindle 116 is attached to a compliant device, such as an AGE-S model compliant device manufactured by Schunk Intec AB, Sweden, which drives the spindle 116 to rotate about axis 103 as well as nutate about axis 220.

The upper assembly 100 can also include an alignment member. In one example, the alignment member comprises a plurality of alignment members. For example, as shown, the alignment member can comprise three alignment members 150 although two or more than three alignment members may be used in further examples. As shown, the alignment members 150 may be supported by the base structure 110 and configured to be radially extended and retracted with respect to the base structure 110. In further examples, the alignment members 150 may be configured to be vertically raised and lowered with respect to the base structure 110. The alignment members 150 can be configured to engage a second end 304 of an outer peripheral surface 302 of the honeycomb body 300 to align the second support member 102 with respect to the second end 304 of the honeycomb body 300. As shown, three alignment members 150 are provided although any number of alignment members may be provided in further examples. For example, a single or a plurality of alignment members may be provided in accordance with aspects of the present invention.

The alignment members 150 can comprise a wide range of shapes and sizes. As shown, the alignment members 150 are substantially identical to one another although one or more of the alignment members may have different sizes and/or shapes. As shown, in one example, each of the alignment members 150 can include a peg 156. The illustrated peg 156 comprises a horizontal peg although other peg orientations may be included in further examples. As shown in FIGS. 1 and 2, each peg 156 can include a pair of opposed horizontal flats 157 or other structures configured to facilitate engagement of the alignment member 150 by an installation tool.

The end of each peg 156 can include a surface 152 that is substantially flat to provide a vertical line contact with an outer peripheral surface 302 of the honeycomb body 300. Providing a line contact between the alignment members 150 and the outer peripheral surface 302 can reduce the bearing stress on the honeycomb body 300. In further examples, the surface 152 of the alignment members 150 can include surfaces that are not substantially flat. For instance, the surface can comprise a cylindrical concave surface to provide one or two vertical lines of contact per alignment member. Indeed, a single vertical line contact near the middle of the surface 152 can be provided if the cylindrical concave surface of the alignment member 150 has a radius that is greater than a radius of the second end 304 of the outer peripheral surface 302 of the honeycomb body 300. On the other hand, two lateral vertical lines of contact can be provided near opposed edges of the concave surface if the cylindrically concave surface of the alignment member 150 has a radius that is less than a radius of the second end 304 of the outer peripheral surface 302 of the honeycomb body 300. Still further, the surface 152 can comprise a spherical or other curved surface to provide a point contact. In further examples, the alignment members 150 can include a surface configured to engage the outer peripheral surface 302 of the honeycomb body 300 along a profile other than a point or one or two lines. For example, one or more of the alignment members can be configured to engage the outer peripheral surface 302 along a plurality of points, three or more lines, or the like.

Figure 5A:
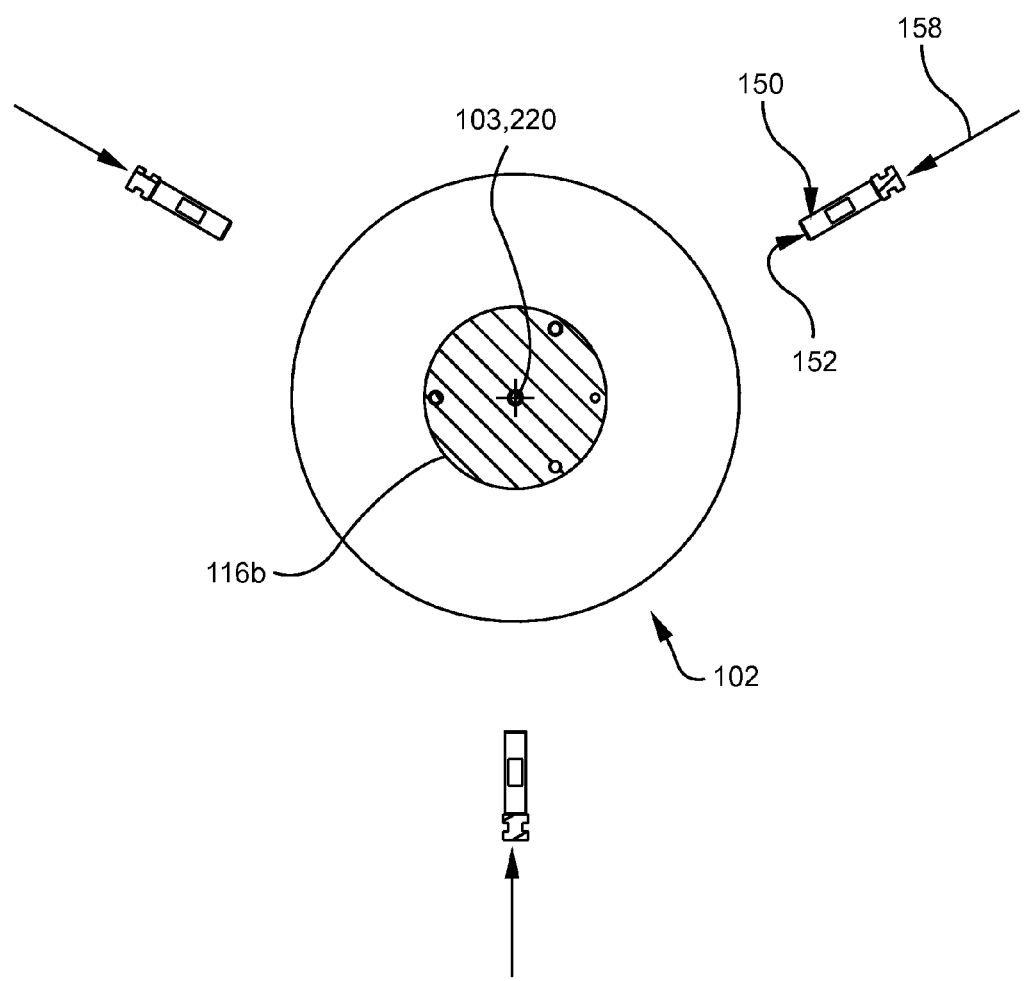
FIG. 5A is a partial schematic sectional view of the example apparatus and honeycomb body along line 5A-5A of FIG. 5.
Figure 6:
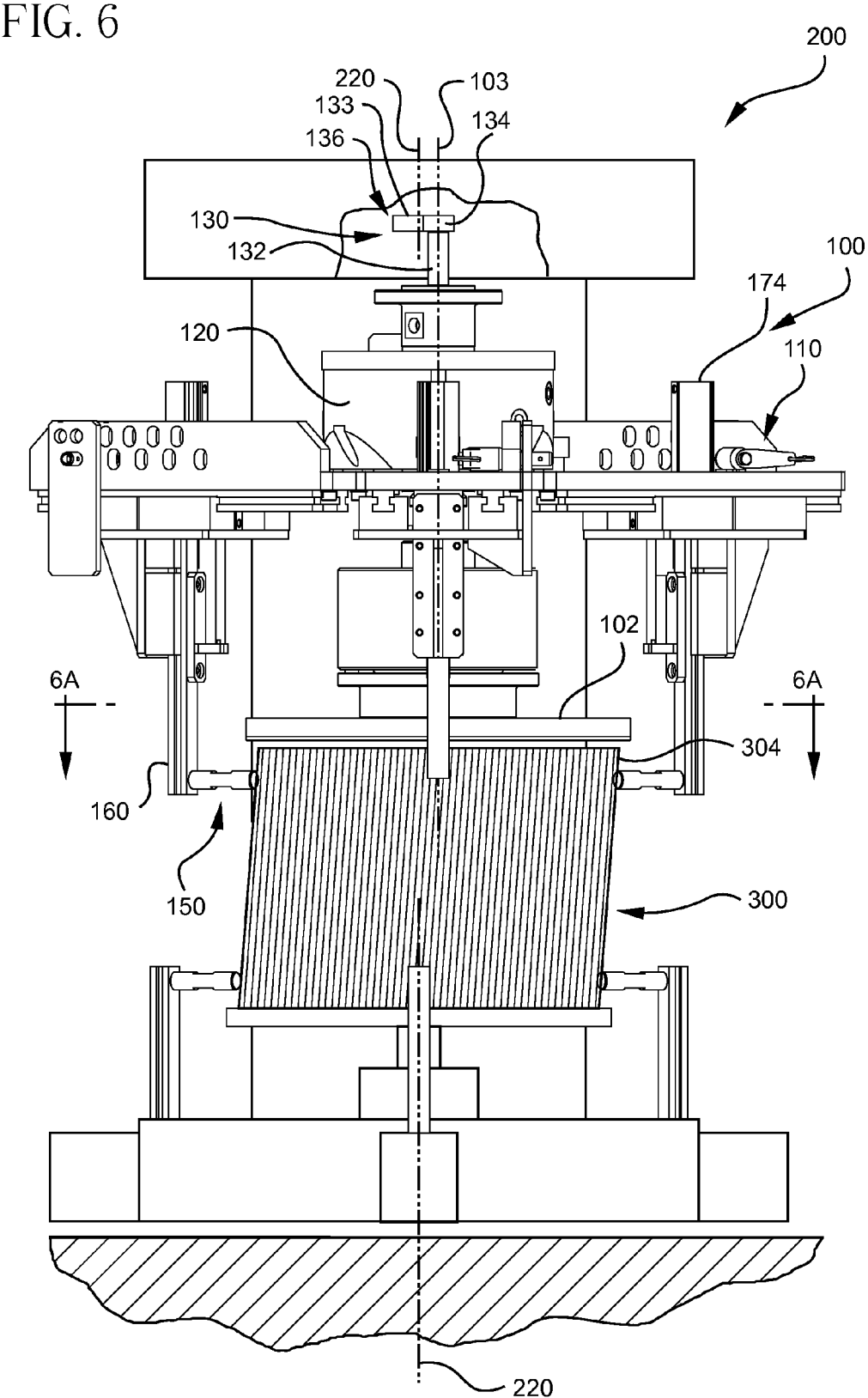
FIG. 6 is a front schematic view of the example apparatus and honeycomb body of FIG. 5 with the alignment members of the upper assembly retracted with respect to the base structure to align the second support member with respect to the second end of the honeycomb body.
Figure 6A:
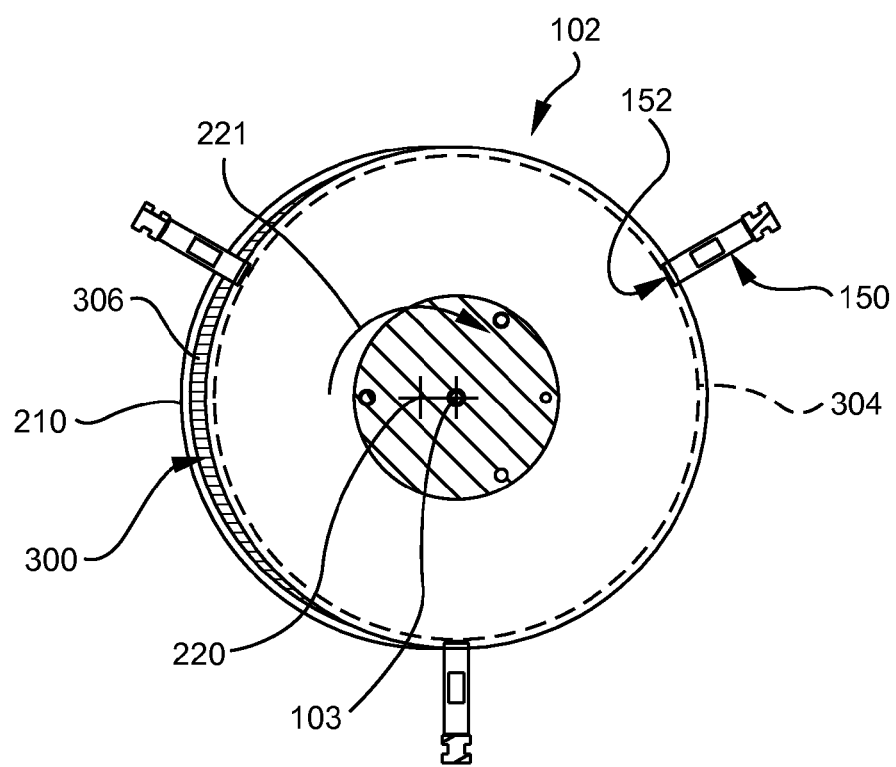
FIG. 6A is a partial schematic sectional view of the example apparatus and honeycomb body along line 6A-6A of FIG. 6.

As shown in FIGS. 6 and 6A, the surface 152 of the alignment members 150 are configured to be retracted radially underneath the second support member 102. As shown in FIG. 5A, the alignment members 150 can be each radially retracted in a linear direction 158 towards the second longitudinal axis 103 of the second support member 102 from the position shown in FIG. 5A to the position shown in FIG. 6A. Likewise, the alignment members 150 can be each radially extended along an opposite linear direction away from the second longitudinal axis 103 from the position shown in FIG. 6A to the position shown in FIG. 5A. In further examples, the alignment members may be radially extended/retracted in a linear direction that doesn't pass through the second longitudinal axis 103. In still further examples, the alignment members may be radially extended/retracted along a curved or other path that not linear, such as a curved path.

Each alignment member 150 can be provided with a support arm 154 attaching the corresponding alignment member 150 to the base structure 110. As shown, the support arms 154 are each identical to one another although one or more of the support arms may include a different configuration in further examples. Each support arm 154 can comprise a wide variety of alternative structures. In the illustrated example, each support arm 154 includes a vertical arm portion 160. A threaded end of the corresponding alignment member 150 may be threaded into an end of the vertical arm portion 160. A tool can be used to engage the horizontal flats 157 to facilitate rotation of the alignment member 150 during the threading process.

As shown in FIG. 1, the vertical arm portion 160 can also be vertically slidably received by a carriage 166 of a horizontal arm portion 162. The carriage 166 can include a guide rail 168 configured to receive a tongue 170 of a corresponding guide rail attached to the horizontal arm portion 162. The carriage 166 can also include a retaining bracket 172 to facilitate selective locking of the radial position of the carriage 166 with respect to the horizontal arm portion 162. For example, as shown, a vertical flange of the horizontal arm portion 162 includes a plurality of apertures 164 arranged along radial positions of the horizontal arm portion 162. A locking member 161, such as the illustrated locking pin, is configured to extend through a selected one of the apertures 164 and a corresponding aperture in the retaining bracket 172 to selectively lock the carriage 166 in a desired radial position with respect to the horizontal arm portion 162. Therefore, example support arms 154 may be adjustable to change the maximum retracted radial position of the alignment members 150 with respect to the base structure 110.

The carriage 166 can also include an elongated slot 165 configured to receive an axial actuator, such as the illustrated vertical actuator 174. The axial actuator is configured to permit the alignment member to be axially adjusted with respect to the base structure. For example, as shown, the axial actuator can comprise a vertical actuator 174 configured to selectively axially raise and lower the alignment member 150 with respect to the base structure 110. In one example, the vertical actuator 174 includes a rod 176 attached to the vertical arm portion 160 by way of a fastening bracket 178. The vertical actuator 174 may comprise a fluid actuator to permit automated raising and lowering of the alignment members 150.

As further shown in FIG. 1, the base structure 110 can include a radial actuator 120 configured to selectively extend and retract the alignment members 150 with respect to the base structure 110. The illustrated radial actuator 120 is attached to the swing arm 112 with the spindle column 116c extending through a central portion of the radial actuator 120. The illustrated radial actuator 120 comprises a chuck although other actuators may be used in further examples. The radial actuator 120 can be configured to simultaneously move the alignment members 150. For example, the radial actuator 120 can simultaneously extend and/or retract the alignment members 150 with respect to the base structure 110. In further examples, the radial actuator can move the alignment members at different times during extension and/or retraction. The radial actuator 120 can also move the alignment members 150 a substantially equal distance during extension and/or retraction.

FIG. 2 depicts a partial schematic view of portions of an apparatus 200 configured to apply a cement mixture 310 (see FIGS. 7-9) to the outer peripheral surface 302 of the honeycomb body 300. As shown, the upper assembly 100 is attached to the frame 202 by the support bracket 114. The apparatus 200 can further include a base 214 and a motor 216 configured to rotate a first support member 210 about the first longitudinal axis 220.

The first support member 210 can be identical or different than the second support member 102. For example, the first support member 210 can comprise a mirror image of the second support member 102. It will therefore be appreciated that the first support member 210 can include a plate although the first support member may comprise a hub and spoke arrangement, lattice structure, or other structural arrangement. Moreover, as shown, the first support member 210 can include a first peripheral surface 212. The illustrated first peripheral surface 212 is shown as an edge with a vertical thickness that extends substantially perpendicular to the upper and lower surface of the first support member 210. In further examples, the first peripheral surface can comprise a sharp or blunted edge. For example, the first peripheral surface can comprise a substantially V-shape with a sharp or blunted edge. In another example, the first peripheral surface can comprise an angularly tapered surface having an outer edge that is sharp or blunted at the top or bottom surface of the first support member 210.

The first peripheral surface can comprise a wide variety of shapes and sizes. The illustrated first peripheral surface 212 comprises a circular shape although the first peripheral surface may include other shapes in different examples. For instance, the first peripheral surface 212 can comprise an oval shape, elliptical shape or other shape that may depend on the shape of a honeycomb body 300 being coated by the apparatus 200. In the illustrated example, the first and first peripheral surface 104, 212 have a substantially identical circular shape although the peripheral surfaces may have different shapes in further examples.

The first support member 210 and/or the second support member 102 can also include a friction surface configured to frictionally engage the end portions of the honeycomb body 300. For example, as shown in FIG. 2, the lower surface of the second support member 102 can include a friction layer 106. The friction layer 106 can comprise a layer of elastomeric material although other materials may be used in further examples. It will be appreciated that a similar layer of material can be provided on the upper surface of the first support member 210 in further examples.

Figure 5:
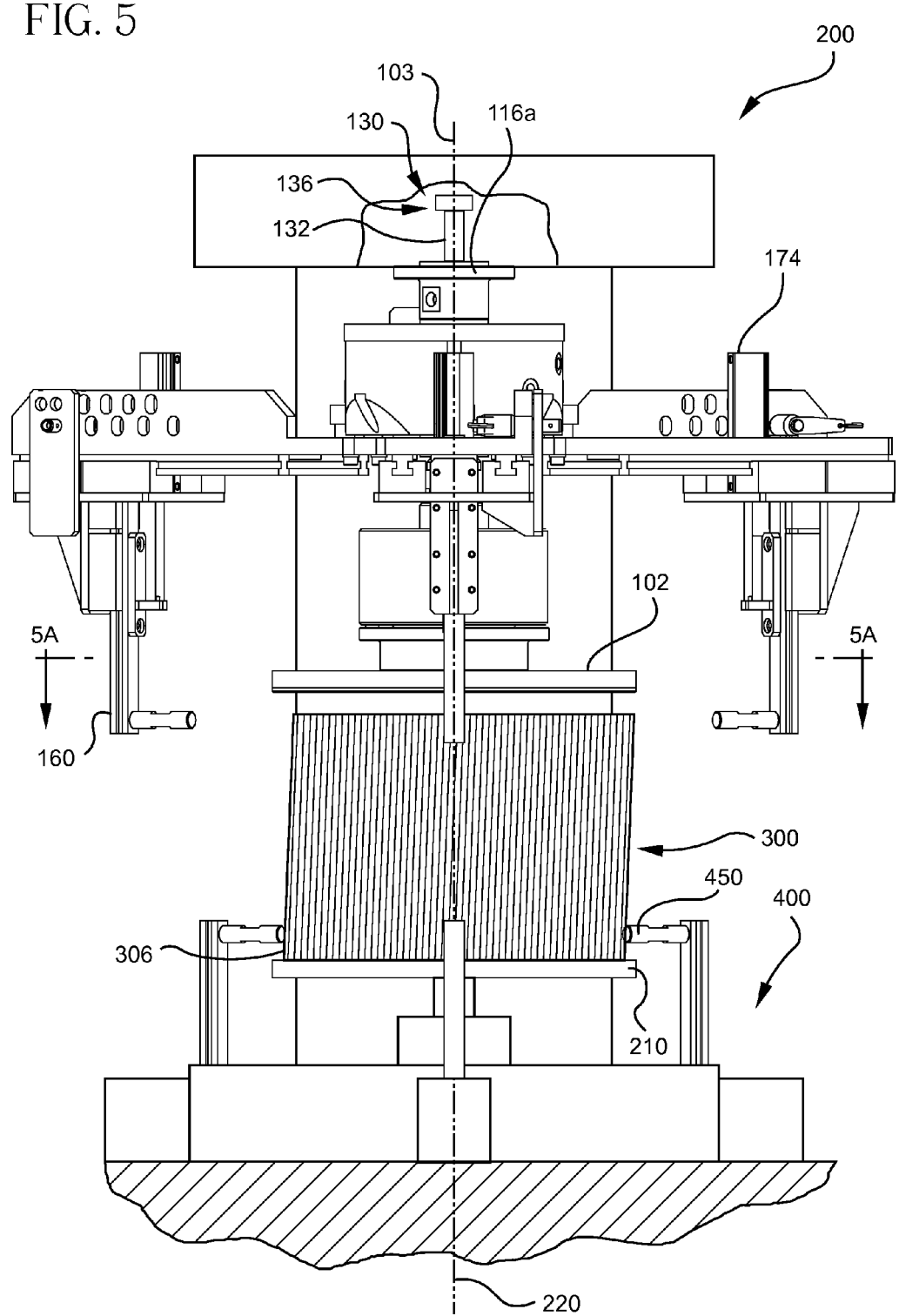
FIG. 5 is a front schematic view of the example apparatus and honeycomb body of FIG. 4 with the alignment members of the lower alignment mechanism retracted to align the first end of the honeycomb body with respect to the first support member.

As shown schematically in the breakaway portions of FIGS. 5 and 6, the apparatus 200 can further include an adjustment device 130 configured to allow the second support member 102 to move relative to the first support member 210 when aligning the second support member 102 with respect to the second end 304 of the honeycomb body 300. For example, the adjustment device 130 can include a vertical support rod 132 extending along the second longitudinal axis 103 of the second support member 102. The vertical support rod 132 can be attached at one end to the adapter 116a and attached at the other end to a pivot assembly 136. As shown in FIG. 6, the pivot assembly 136 can include a bearing 134 configured to allow rotation of the vertical support rod 132 about the second longitudinal axis 103 as a crank rod 133 rotates the second longitudinal axis 103 of the second support member 102 about the first longitudinal axis 220. As shown in FIGS. 6 and 6A, the second longitudinal axis 103 of the second support member 102 is offset from the first longitudinal axis 220.

Figure 8:
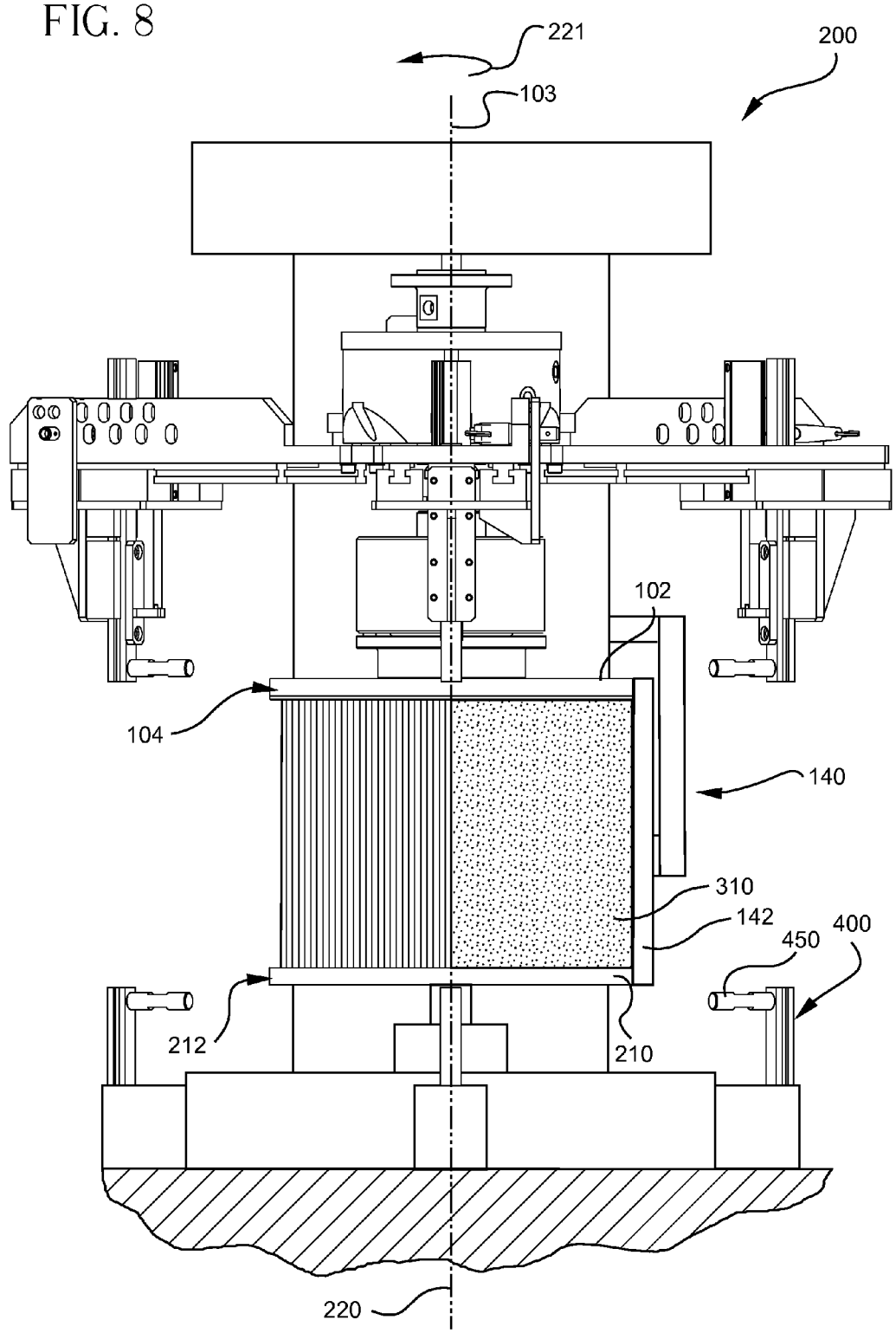
FIG. 8 is a front schematic view of the example apparatus of FIG. 7 with the honeycomb body rotated 90° while the applicator applies a cement mixture to the honeycomb body.
Figure 9:
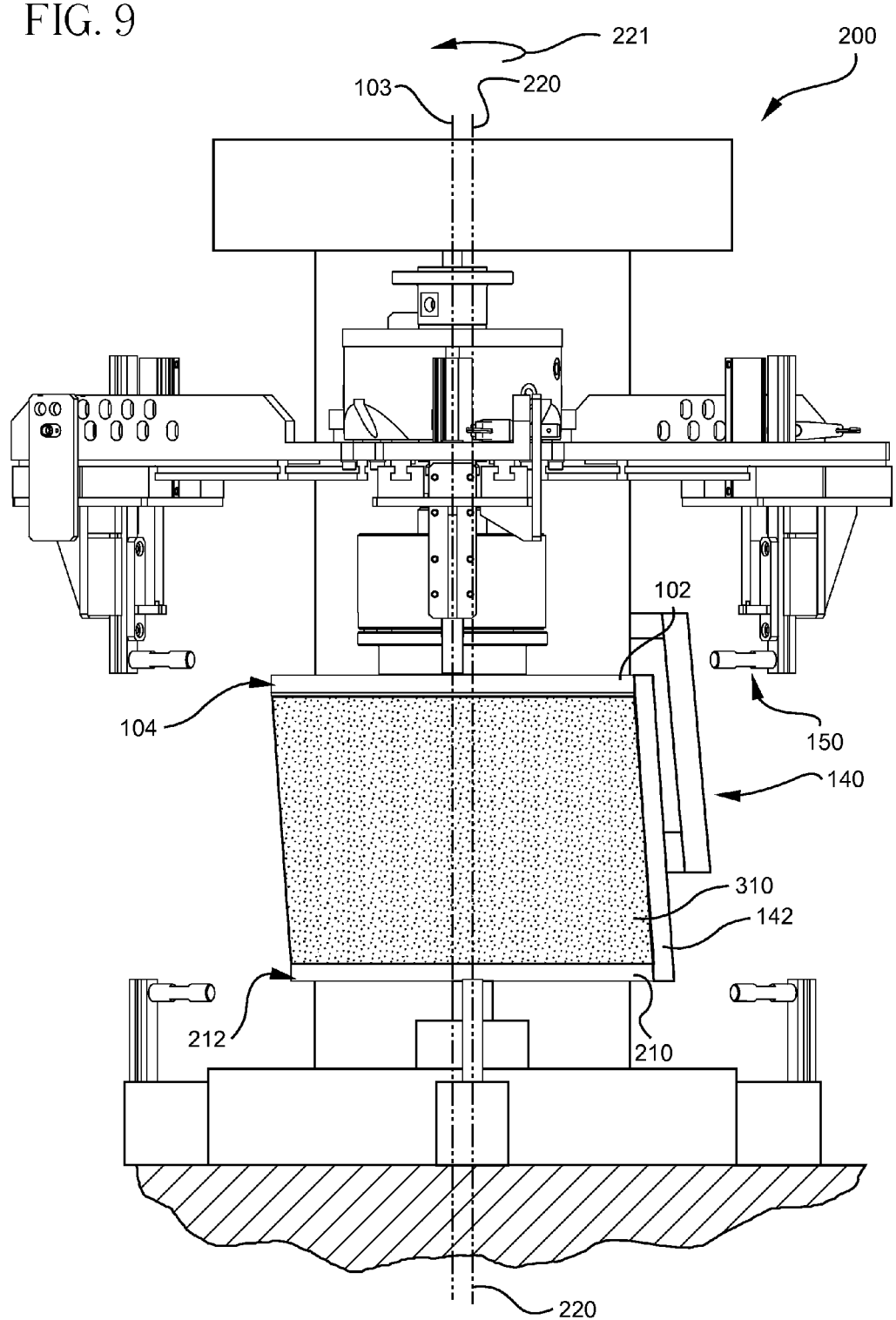
FIG. 9 is a front schematic view of the example apparatus of FIG. 7 with the honeycomb body rotated 180° while the applicator applies a cement mixture to the honeycomb body.

As schematically shown in FIGS. 7-9, the apparatus 200 can further include an applicator 140 configured to apply the cement mixture 310 to the outer peripheral surface 302 of the honeycomb body 300. The applicator 140 can comprise a wide variety of configurations to apply a cement mixture in different ways. For example, the applicator 140 can comprise a spraying device or other cement mixture device. As illustrated, the applicator 140 can include an optional blade 142 and an optional nozzle 144. The blade 142 can be configured to simultaneously engage the first peripheral surface 212 and the second peripheral surface 104 when applying the cement mixture 310 to the outer peripheral surface 302 of the honeycomb body 300. Moreover, the nozzle 144 can apply the cement mixture 310 to the outer peripheral surface 302 while the blade 142 simultaneously engages the first peripheral surface 212 and the second peripheral surface 104. As further shown in FIGS. 7-9, the blade 142 can be configured to articulate as the honeycomb body 300 rotates about the first longitudinal axis 220 such that the blade 142 continuously remains in contact with the peripheral surfaces 212, 104 during rotation of the honeycomb body 300.

Figure 4:
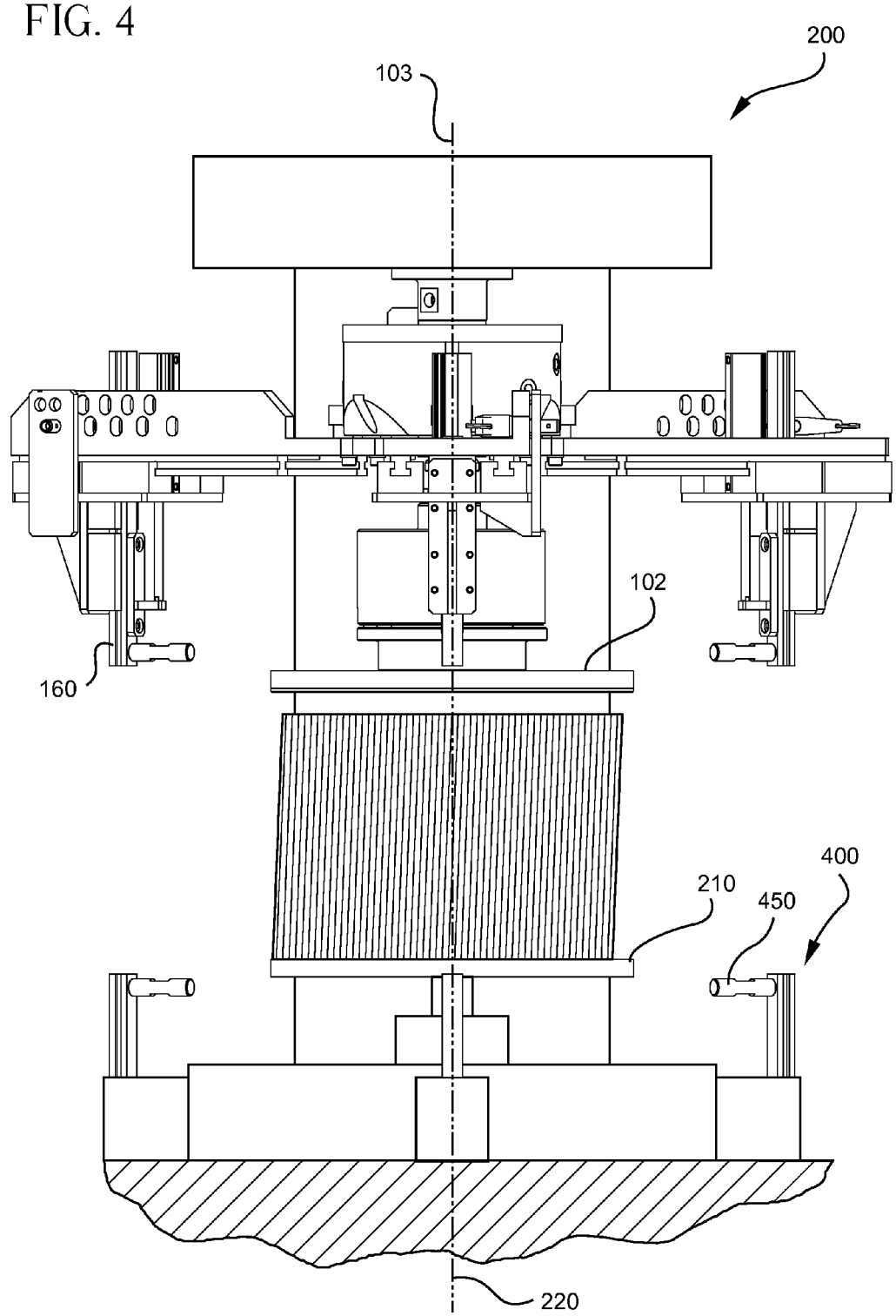
FIG. 4 is a front schematic view of the example apparatus and honeycomb body of FIG. 3 with a lower alignment mechanism.

As shown in FIGS. 4 and 5, the apparatus 200 can also include a lower alignment mechanism 400. A wide range of lower alignment mechanisms may be provided. For instance, a V-chuck or two constricting members may be provided. In the illustrated example, the lower alignment mechanism 400 can include an alignment member such as a plurality of alignment members. As shown, three alignment members 450 are provided although one or any number of alignment members may be provided in further examples. The alignment members 450 are configured to engage a first end 306 of the outer peripheral surface 302 of the honeycomb body 300 to align the first support member 210 with respect to the first end 306 of the honeycomb body 300.

An example method of applying the cement mixture 310 to an outer peripheral surface 302 of a honeycomb body 300 with the apparatus 200 is shown schematically in FIGS. 2-9. The apparatus 200 may be used to apply a cement mixture to a wide variety of honeycomb bodies, particularly honeycomb bodies comprised of ceramic or ceramic-forming material(s). The honeycomb bodies can be formed into a flow through substrate (e.g., catalyst support) or filter, such as a particulate filter (e.g., comprising a plugged honeycomb body which may include alternately plugged channels). By way of example, the honeycomb body can be comprised of cordierite, aluminum titanate, SiC, or other ceramic materials, or combinations thereof. The cement mixture 310 can comprise material that is compatible with the material of the honeycomb body 300. For example, although not required, the cement mixture 310 can comprise material that is substantially identical to the material of the honeycomb body 300.

As shown in FIG. 2, the radial actuator 120 may be activated to radially extend the alignment members 150 with respect to the base structure 110. In addition, the vertical actuator 174 can be activated to vertically raise the alignment members 150 with respect to the base structure 110. Radially extending and vertically raising the alignment members 150 with respect to the base structure 110 provides sufficient clearance for insertion of the honeycomb body 300.

Figure 3:
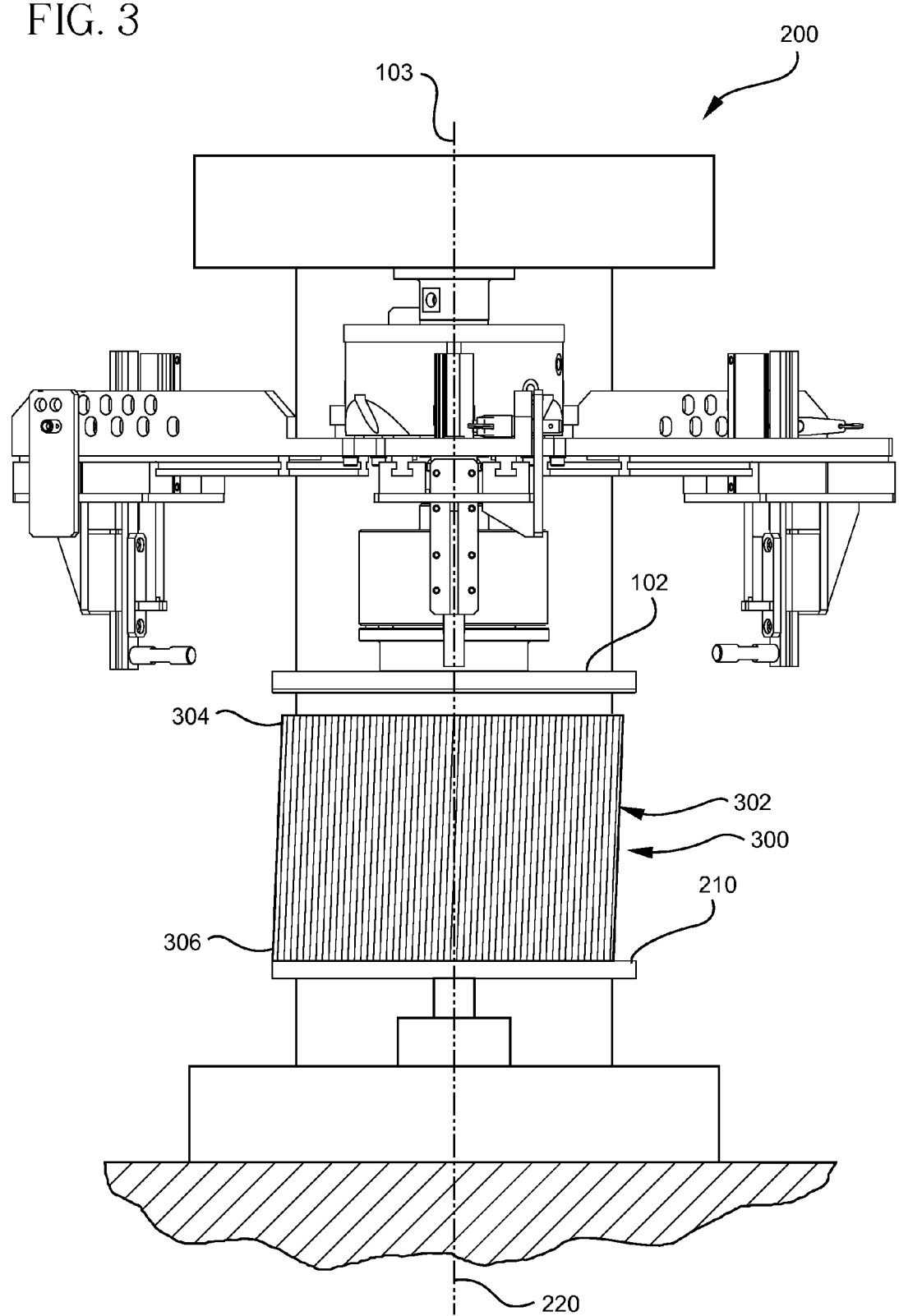
FIG. 3 is a front schematic view of the example apparatus of FIG. 2 with a honeycomb body positioned on the first support member.

As shown in FIG. 3, the honeycomb body 300 can be placed on the first support member 210. As shown, the honeycomb body 300 may have a second end 304 that is axially offset from a first end 306. As shown, the honeycomb body 300 may be initially placed on the first support member 210 in various locations that might not align the first end 306 of the honeycomb body 300 with the longitudinal axis of the first support member 210. As shown, the rotation axis of the first support member 210 comprises the first longitudinal axis 220.

The first end 306 of the honeycomb body 300 can then be aligned with respect to the first support member 210. For example, as shown in FIG. 4, a lower alignment mechanism 400 may be provided with alignment members 450 in an extended position. As shown in FIG. 5, the alignment members 450 can be retracted to align the first end 306 of the honeycomb body 300 with respect to the first support member 210.

Although not required in all examples, as shown in FIG. 5, the alignment members 450 may remain retracted while the second support member 102 is aligned with respect to the second end 304.

An example process of aligning the second support member 102 with respect to the second end 304 of the honeycomb body 300 will now be described. As shown in FIG. 5, the vertical actuators 174 may be activated to vertically lower the alignment members 150 with respect to the base structure 110. Next, as shown in FIG. 6, the vertical support rod 132 of the adjustment device 130 can lower the base structure 110 such that the bottom of the second support member 102 is positioned adjacent the upper surface of the honeycomb body 300. Next, the radial actuator 120 may be activated to radially retract the three alignment members 150 with respect to the base structure 110. The three alignment members 150 can be retracted into peripheral engagement with the second end 304 of the outer peripheral surface 302 of the honeycomb body 300. For example, as shown in FIG. 5A, each alignment member 150 can be radially retracted along the linear direction 158. As shown in FIG. 6A, each alignment member 150 can be radially retracted until the surface 152 of each alignment member 150 engages the second end 304 of the outer peripheral surface 302.

The adjustment device 130 is configured to allow the second support member 102 to move relative to the first support member 210 when aligning the second support member 102 with respect to the second end 304 of the honeycomb body 300. Thus, it will be appreciated that the second support member 102 is free to move with respect to the first support member 210 when aligning the second support member 102 with respect to the second end 304 of the honeycomb body 300. Once the alignment members 150 engage the second end 304 of the outer peripheral surface 302 of the honeycomb body 300, the second support member 102 moves relative to the first support member 210 such that the second longitudinal axis 103 of the second support member 102 is moved out of alignment from the first longitudinal axis 220.

The second support member 102 can move in different ways when aligning the second support member 102 with respect to the second end 304 of the honeycomb body 300. For example, aligning can include movement having a directional component in a direction that is not coincident with the longitudinal axis 103 of the second support member 102. For example, aligning can include movement of the second support member 102 that is perpendicular, to the longitudinal axis 103. In further examples, it is possible that aligning can include movement with a directional component in a direction that is coincident with the longitudinal axis. For instance, aligning can include movement of the second support member 102 at an angle with respect to the longitudinal axis. Still further, aligning can include movement that is entirely in a direction that is coincident with the longitudinal axis. Moreover, aligning can include combinations of movements in further examples.

The vertical support rod 132 can then further lower the base structure 110 to fix the position of the honeycomb body 300 with respect to the first support member 210 and the second support member 102. The fixation can be provided by compressing the honeycomb body 300 between the support members 210, 102. Once compressed, the orientation of the honeycomb body 300 is fixed by friction between the upper surface of the honeycomb body 300 and the lower surface of the second support member 102 and friction between the lower surface of the honeycomb body 300 and the upper surface of the first support member 210. As shown in FIG. 7, once fixed, the outer peripheral surface 302 of the honeycomb body 300 is recessed with respect to the peripheral surfaces 104, 212 of the first and second support members 210, 102.

As further shown in FIG. 7, the alignment members 150, 450 can then be extended with respect to the second support member 102 and the base structure 110. The alignment members 150 can also be vertically raised by the vertical actuators 174. As shown in FIG. 7 vertically raising the alignment members 150 and radially extending the alignment members 150, 450 can permit use of the applicator 140 while reducing, such as preventing, contamination of the alignment members 150 with cement mixture material from the applicator 140.

Next, as shown in FIGS. 7-9, an applicator 140 may be used to apply the cement mixture 310 of material to the outer peripheral surface 302 of the honeycomb body 300. As shown, the first support member 210, the second support member 102 and the honeycomb body 300 can be rotated together in the direction 221 with respect to the applicator 140. In one example, the applicator can be designed to rotate while the support members 210, 102 and honeycomb body 300 remain stationary. Alternatively, as shown, the support members 210, 102 and the honeycomb body can rotate with respect to the applicator 140 about the first longitudinal axis 220. As shown in FIG. 7A, during rotation, the second longitudinal axis 103 of the second support member can rotate about the first longitudinal axis 220 along direction 221. The connection between the swing arm 112 and the support bracket 114 allows the swing arm 112 to move during rotation such that the end of the swing arm 112 moves with the second longitudinal axis 103 as the second longitudinal axis 103 rotates about the first longitudinal axis 220.

In one example, the applicator 140 can include a blade 142 that simultaneously engages the second peripheral surface 104 and the first peripheral surface 212 when applying the cement mixture 310 of material to the outer peripheral surface 302 of the honeycomb body 300. As shown in FIGS. 7-9, the blade 142 may be configured to articulate to provide continuous engagement between the blade 142 and the peripheral surfaces 104, 212 during rotation as the cement mixture 310 is applied to the outer peripheral surface 302 of the honeycomb body 300. As shown in FIGS. 7-9, it will be appreciated that the cement mixture 310 may be applied with a substantially consistent thickness about portions of the outer peripheral surface 302 of the honeycomb body 300. For instance, the cement mixture 310 may be applied with a substantially consistent thickness throughout a circumferential portion of the peripheral surface 302. In further examples, the cement mixture 310 may include a substantially changing thickness in a direction from the second end 304 to the first end 306 of the peripheral surface 302. In still further examples, the cement mixture 310 may be applied with a substantially consistent thickness over substantially the entire outer peripheral surface 302.

As shown, the cement mixture can be applied while the honeycomb body 300 rotates about the first longitudinal axis 220 that is substantially vertical. In further examples, the first longitudinal axis 220 may be substantially horizontal or positioned at an angle between vertical and horizontal orientations. Moreover, alignment, fixing and rotation the honeycomb body is shown to occur while the honeycomb body has channels extending substantially vertically. In further examples, one or more alignment, fixing and/or rotation process may occur in a substantially horizontal or at an angle between the vertical and horizontal orientations.

It will be apparent to those skilled in the art that various modifications and variations can be made in the present invention without departing from the spirit or scope of the invention. Thus, it is intended that the present invention cover the modifications and variations of this invention provided they come within the scope of the appended claims.

What is claimed is:

1. An apparatus configured to apply a cement mixture to a honeycomb body with a first end and a second end, the apparatus comprising:
   an applicator configured to apply the cement mixture to the honeycomb body;
   a first support member configured to rotate about a first longitudinal axis and align the first end of the honeycomb body with the first longitudinal axis;
   a motor configured to rotate the first support member about the first longitudinal axis;
   a second support member configured to rotate about a second longitudinal axis;
   a base structure configured to rotatably support the second support member and permit relative movement between the second support member and the first support member between a first orientation where the second longitudinal axis is positioned with respect to the first longitudinal axis and a second orientation where the second longitudinal axis is not coincident with the first longitudinal axis;
   a plurality of alignment members supported by the base structure and configured to be selectively extended and retracted with respect to the base structure, wherein the alignment members are configured to engage the second end of the honeycomb body to align the second support member with respect to the second end of the honeycomb body; and
   an actuator configured to selectively extend and retract the alignment members with respect to the base structure.

2. The apparatus of claim 1, further comprising an adjustment device configured to permit rotation of the second longitudinal axis about the first longitudinal axis.

3. The apparatus of claim 1, wherein the first support member includes a first peripheral surface, the second support member includes a second peripheral surface, and the applicator includes a blade, wherein the blade is configured to simultaneously engage the first peripheral surface and the second peripheral surface when applying the cement mixture to the honeycomb body.

4. The apparatus of claim 1, wherein the plurality of alignment members comprises at least three alignment members.

5. The apparatus of claim 1, wherein the second support member is configured to nutate about the first longitudinal axis.

* * * * *